(12) United States Patent
Sanders et al.

(10) Patent No.: US 7,877,310 B1
(45) Date of Patent: Jan. 25, 2011

(54) SYSTEMS AND METHODS FOR DETERMINING AN EARNINGS PORTION OF A DISTRIBUTION FROM A 529 PLAN

(76) Inventors: Alexandra S. Sanders, 31 Lakeview Dr., Charlton, MA (US) 01507; David M. Gauntt, 61 Albert St., Portsmouth, RI (US) 02871; Sara Geraghty, 27 Christie Way #63E, Marlborough, MA (US) 01752; Bryan E. Anderson, 34 Walker Avenue-Extension, Milford, MA (US) 01751; Timothy B. Calderara, 14 Community Dr., Cranston, RI (US) 02905; Erica Kuharich, 166 Hill St., Holliston, MA (US) 01746; Mohan N. Pandhare, 18 Kennedy Dr., N. Chelmsford, MA (US) 01863; Luther Townsend, 21 HIllside Ter., Merrimack, NH (US) 03054

( * ) Notice: Subject to any disclaimer, the term of this patent is extended or adjusted under 35 U.S.C. 154(b) by 0 days.

(21) Appl. No.: 12/797,358

(22) Filed: Jun. 9, 2010

Related U.S. Application Data

(63) Continuation of application No. 11/710,685, filed on Feb. 26, 2007, now Pat. No. 7,756,771, which is a continuation of application No. 11/477,170, filed on Jun. 28, 2006, now abandoned, which is a continuation of application No. 11/255,476, filed on Oct. 21, 2005, now abandoned.

(60) Provisional application No. 60/621,021, filed on Oct. 21, 2004.

(51) Int. Cl.
*G06Q 40/00* (2006.01)
(52) U.S. Cl. .................................. 705/36 R; 705/37
(58) Field of Classification Search .......... 705/36 R–37
See application file for complete search history.

(56) References Cited

U.S. PATENT DOCUMENTS

2004/0236652 A1* 11/2004 Heiges et al. .................. 705/35

* cited by examiner

*Primary Examiner*—Thu Thao Havan
(74) *Attorney, Agent, or Firm*—K&L Gates LLP

(57) ABSTRACT

A method for determining an earnings portion of a distribution from a 529 plan. The method includes receiving information associated with a plurality of 529 plan accounts, identifying related 529 plan accounts, aggregating the information for related 529 plan accounts, and determining an earnings portion of a distribution from at least one of the 529 plan accounts.

23 Claims, 2 Drawing Sheets

US 7,877,310 B1

SYSTEMS AND METHODS FOR DETERMINING AN EARNINGS PORTION OF A DISTRIBUTION FROM A 529 PLAN

CROSS-REFERENCE TO RELATED APPLICATIONS

This application is a continuation of U.S. patent application Ser. No. 11/710,685 filed on Feb. 26, 2007 now U.S. Pat. No. 7,756,771, which is a continuation of U.S. patent application Ser. No. 11/477,170 filed on Jun. 28, 2006 now abandoned, which is a continuation of U.S. patent application Ser. No. 11/255,476 filed on Oct. 21, 2005 now abandoned, which claims priority to U.S. Provisional Application No. 60/621,021 filed Oct. 21, 2004.

BACKGROUND

This application discloses an invention that is related, generally and in various embodiments, to systems and methods for determining an earnings portion of a distribution from a 529 plan.

With the increased recognition of the importance of higher education, more and more people are determined to attend college after graduating from high school. Unfortunately, the cost of attending college continues to rise. To help make attending college more affordable, many states have enacted legislation to establish financial products commonly known as 529 plans. Money invested in a 529 plan accumulates on a tax-deferred basis, thereby making it an attractive investment vehicle for meeting future college education expenses. Generally, for a given state, the state awards a mandate to a program manager to administer the 529 plan authorized by the state. The program manager may subsequently authorize other providers (e.g., mutual fund companies) to run their own 529 plans under the program manger's mandate. Each account in a 529 plan of a given state has an owner and a beneficiary associated therewith. The beneficiary can be the beneficiary of multiple accounts, and each account may have a different owner.

Generally, each state sets a maximum limit associated with a 529 plan account beneficiary, and the administrator of each 529 plan is responsible for complying with the state's maximum limit. For some 529 plans, the maximum limit concerns a total fair market value for 529 plan accounts having the same beneficiary. For other 529 plans, the maximum limit concerns a total value of contributions made to 529 plan accounts having the same beneficiary.

Internal Revenue Service regulations require 529 plans determine an earnings portion of each distribution made therefrom as of the date of the distribution. When the distribution is for a 529 plan account that has the same owner/beneficiary combination as one or more additional 529 plan accounts, each of the 529 plan accounts having the same owner/beneficiary combination need to be aggregated in order to determine the correct earnings portion of the distribution. There may be any number of accounts that need to be aggregated.

From the foregoing, it is apparent that the regulatory burden imposed on administrators of 529 plans can be significant. Unfortunately, many administrators are not currently able to meet the various requirements in a uniform, cost-effective manner.

SUMMARY

In one general respect, this application discloses embodiments of a method for determining an earnings portion of a distribution from a 529 plan. According to various embodiments, the method includes receiving information associated with a plurality of 529 plan accounts, identifying related 529 plan accounts, aggregating the information for related 529 plan accounts, and determining an earnings portion of a distribution from at least one of the 529 plan accounts.

In another general respect, this application discloses embodiments of a system for determining an earnings portion of a distribution from a 529 plan. According to various embodiments, the system includes a database for storing information associated with a plurality of 529 plan accounts, and a distribution module in communication with the database. The distribution module is for determining an earnings portion of a distribution amount from at least one of the 529 plan accounts.

Aspects of the disclosed invention may be implemented by a computer system and/or by a computer program stored on a computer readable medium. The computer readable medium may comprise a disk, a device, and/or a propagated signal.

Other features and advantages will be apparent from the following description, including the drawings, and from the claims.

DETAILED DESCRIPTION

Figure 1:
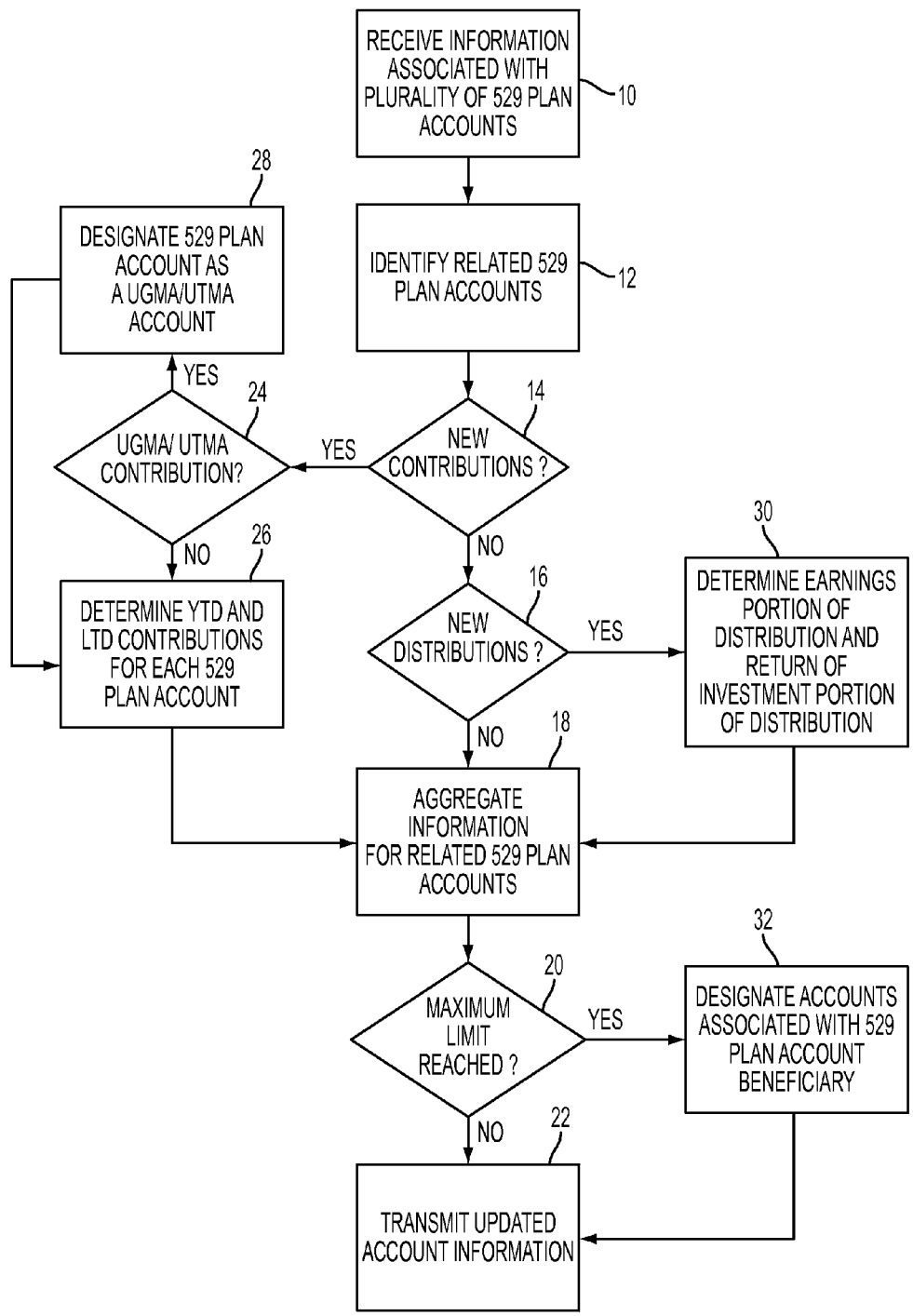
FIG. 1 illustrates various embodiments of a method for determining an earnings portion of a distribution from a 529 plan.

FIG. 1 illustrates various embodiments of a method for determining an earnings portion from a distribution from a 529 plan. Prior to the implementation of the method illustrated in FIG. 1, starting positions may be provided by various 529 plan providers for each 529 plan account. The starting positions may be defined by the fair market value (FMV) of the account, the life-to-date contributions (LTD Cont) to the account, and the life-to-date return of investment (LTD ROI). For ease of description purposes only, the method will be described in terms of a 529 plan for a given state. However, one skilled in the art will readily recognize that the method can be implemented for any number of 529 plans for any number of states, either sequentially or concurrently.

The process illustrated in FIG. 1 begins at block 10, where a service provider (e.g., PFPC) receives information associated with a plurality of 529 plan accounts. The information may be received directly or indirectly from a 529 plan provider, and one skilled in the art will appreciate that the service provider may receive such information from any number of 529 plan providers for any number of states. The information may be received at a computing device associated with the service provider and stored in a database that is in communication with the computing device. The information may include price, position and activity information for each 529 plan account in the 529 plan. The information may also include a state plan ID, an owner ID and a beneficiary ID for each 529 plan account. According to various embodiments, the owner ID may be the owner's social security number and the beneficiary ID may be the beneficiary's social security number. The process described at block 10 may occur on a periodic basis such as, for example, on a daily basis.

From block 10, the process advances to block 12, where related 529 plan accounts are identified. Identifying the related 529 plan accounts includes identifying 529 plan accounts having a common beneficiary and identifying 529 plan accounts having a common owner/beneficiary combination. The process described at block 12 may be repeated for any number of 529 plans for any number of states, either sequentially or concurrently. According to various embodiments, such 529 plan accounts may be designated in a manner that facilitates the grouping together of the accounts for aggregation purposes. The identification process described at block 12 may occur on a periodic basis such as, for example, on a daily basis.

From block 12, the process advances to block 14, where it is determined whether any new contributions have been made to any of the 529 plan accounts that collectively comprise the 529 plan. The determination is made based on a comparison of the information received at block 10 and information stored at the database described hereinbefore. The process described at block 14 may be repeated for any number of 529 plans for any number of states, either sequentially or concurrently.

From block 14, the process advances to block 16 or to block 24. If it is determined that a new contribution has not been made to any of the 529 plan accounts, the process advances from block 14 to block 16, where it is determined whether a new distribution has occurred from any of the 529 plan accounts. The determination is made based on a comparison of the information received at block 10 and information stored at the database described hereinbefore. The process described at block 16 may be repeated for any number of 529 plans for any number of states, either sequentially or concurrently.

From block 16, the process advances to block 18 or block 30. If it is determined that a new distribution from any of the 529 plan accounts has not occurred, the process advances from block 16 to block 18, where the information received at block 10 is aggregated for the related 529 plan accounts. The information may be aggregated for 529 plan accounts having a common beneficiary and for 529 plan accounts having a common owner/beneficiary combination. The process described at block 18 may be repeated for any number of 529 plans for any number of states, either sequentially or concurrently.

From block 18, the process advances to block 20, where it is determined, for each 529 plan account beneficiary, whether a maximum limit associated with the respective 529 plan account beneficiary has been reached. The maximum limit is generally set forth in the 529 plan of the given state, and different states may set different maximum limits. According to various embodiments, the maximum limit may be a maximum aggregate market value for all 529 plan accounts having a common beneficiary. According to other embodiments, the maximum limit may be a maximum aggregate total for life-to-date contributions for all 529 plans having a common beneficiary. The process described at block 20 may be repeated for any number of 529 plans for any number of states, either sequentially or concurrently. If a beneficiary associated with a particular 529 plan account is not associated with any other 529 plan accounts in the various 529 plans of the given state, the aggregated market value of the particular 529 plan account is the same as the market value of the particular 529 plan account. Similarly, the aggregate total for life-to-date contributions for the particular 529 plan account is the same as the life-to-date contributions for the particular 529 plan account.

From block 20, the process advances to block 22 or to block 32. For each 529 plan account beneficiary, if the aggregated market value of the 529 account or accounts associated with the given beneficiary does not exceed the maximum allowable aggregated market value, the process advances to block 22, where the updated 529 plan account information is transmitted to the appropriate plan provider. The process described at block 20 may be repeated for any number of 529 plans in any number of states, either sequentially or concurrently.

Returning to block 14, if it is determined that a new contribution has been made to any of the 529 plan accounts, the process advances from block 14 to block 24, where it is determined whether the new contribution is a UGMA/UTMA contribution. The process described at block 24 may be repeated for any number of 529 plans for any number of states, either sequentially or concurrently.

From block 24, the process advances to block 26 or to block 28. If it is determined that the new contribution is not a UGMA/UTMA contribution, the process advances from block 24 to block 26, where the year-to-date contributions and the life-to-date contributions are determined for each 529 plan account. The updated values of the year-to-date contributions and the life-to-date contributions may be stored in the database described hereinbefore. The process described at block 26 may be repeated for any number of new contributions, either sequentially or concurrently.

From block 26, the process advances to block 18, where the updated values of the year-to-life contributions and the life-to-date contributions, and the information received at block 10, is aggregated for the related 529 plan accounts. From block 18, the process advances to block 20, where the process advances as described hereinbefore.

Returning to block 24, if it is determined that the new contribution is a UGMA/UTMA contribution, the process advances from block 24 to block 28, where the 529 plan account is designated as a UGMA/UTMA account. According to various embodiments, such accounts are designated in a manner that facilitates the separation of UGMA and UTMA accounts from non-UGMA/UTMA accounts. The designation of the UGMA/UTMA accounts allows for the UGMA/UTMA accounts to be aggregated separately from the non-UGMA/UTMA accounts. The process described at block 28 may be repeated for any number of new contributions, either sequentially or concurrently.

From block 28, the process advances to block 26, where the process advances as described hereinbefore, except that UGMA/UTMA accounts are subsequently aggregated separately from non-UGMA/UTMA accounts.

Returning to block 16, if it is determined that a new distribution from any of the 529 plan accounts has occurred, the process advances from block 16 to block 30, where an earnings portion of the distribution is determined and a return of investment portion of the distribution is determined. As each 529 plan account has an owner/beneficiary combination associated therewith, the distribution has an owner/beneficiary combination associated therewith. According to various embodiments, the earnings portion is determined by multiplying the distribution amount by an earnings ratio, where the earnings ratio is equal to the earnings divided by the aggregate market value of the 529 plan accounts having the owner/beneficiary combination that is associated with the distribution. According to various embodiments, the earnings portion may be determined by the following equation:

$$EP = \left(\frac{MV - (C - ROI)}{MV}\right) \times D,$$

where EP equals the earnings portion, MV equals an aggregate market value, C equals an aggregate value of contributions, ROI equals an aggregate value of return of investment, and D equals the distribution amount. According to various embodiments, the return of investment portion is determined by subtracting the earnings portion from the distribution amount. The process described at block 30 may be repeated for any number of distributions, either sequentially or concurrently. The service provider may use the information determined at block 30 to provide consolidated tax reporting (e.g., one tax form and one 1099Q for related distributions). From block 30, the process advances to block 18, where the process advances as described hereinbefore.

Returning to block 20, if it is determined that a maximum limit associated with a 529 plan account beneficiary has been reached, the process advances to block 32, where each of the 529 plan accounts associated with the 529 plan account beneficiary are appropriately designated. According to various embodiments, attempts to subsequently contribute to any of the designated 529 plan accounts may be automatically rejected by the various service providers. The process described in block 32 may be repeated for any number of beneficiaries, either sequentially or concurrently. From block 32, the process advances to block 22, where the process advances as described hereinbefore.

Figure 2:
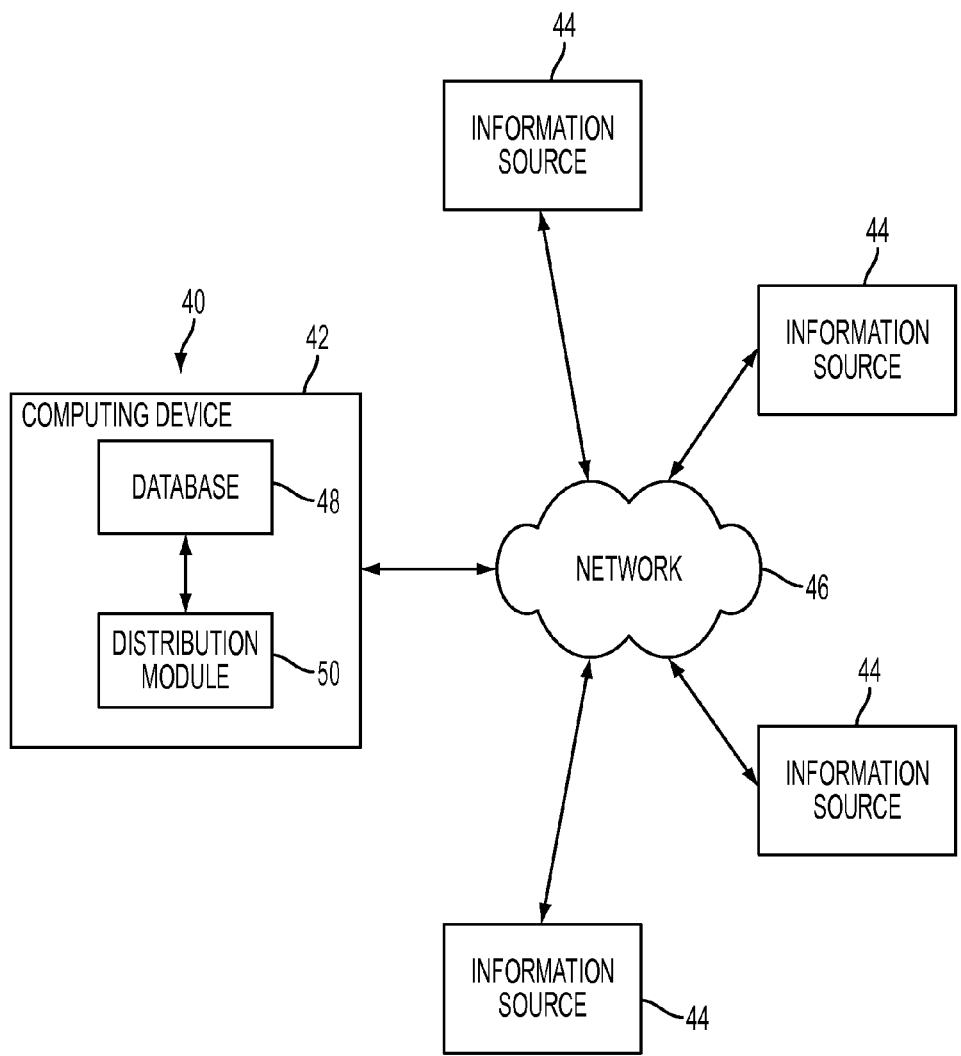
FIG. 2 illustrates various embodiments of a system for determining an earnings portion of a distribution from a 529 plan.

FIG. 2 illustrates a system 40 for determining an earnings portion of a distribution from a 529 plan. The system 40 may be utilized to implement the method described hereinbefore. The system 40 includes a computing device 42 in communication with one or more information sources 44 via a network 46 having wired or wireless data pathways. Each information source 44 may be associated with a different 529 plan provider, and is configured to transmit information associated with a plurality of 529 plan accounts to the computing device 42. The network 46 may be, for example, a local area network (LAN), a metropolitan area network (MAN), a wide area network (WAN), the Internet, an Intranet, an Extranet, the Web, a telephony network (e.g., analog, digital, wired, wireless, PSTN, ISDN, or xDSL), a radio network, a television network, a cable network, a satellite network, and/or any other wired or wireless communications network configured to carry data. The network 46 may include one or more elements, such as, for example, intermediate nodes, proxy servers, firewalls, routers, switches, adapters, sockets, and wired or wireless data pathways, configured to direct and/or deliver data.

In general, the system 40 may be structured and arranged to communicate with the information sources 44 via the network 46 using various communication protocols (e.g., HTTP, TCP/IP, UDP, WAP, WiFi, Bluetooth) and/or to operate within or in concert with one or more other communications systems.

The computing device 42 may be associated with a service provider, and may comprise a database 48 and a distribution module 50. The database 48 may be structured and arranged to store information that the computing device 42 receives from the one or more information sources 44. The distribution module 50 is configured for determining an earnings portion of a distribution from at least one 529 plan account and for determining a return of investment portion of the distribution. The distribution module 50 may also be configured for identifying related 529 plan accounts, aggregating information for related 529 plan accounts, and determining when a maximum limit associated with a 529 plan account beneficiary is reached.

The distribution module 50 may be implemented utilizing any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The distribution module 50 (e.g., software application, computer program) may be stored on a computer-readable medium (e.g., disk, device, and/or propagated signal) such that when a computer reads the medium, the functions described herein are performed. According to various embodiments, the functionality of the distribution module 50 may be implemented by more than one module. Although the computing device 42 is shown as a single unit in FIG. 2 for purposes of convenience, it should be recognized that the computing device 42 may comprise a number of distributed computing devices, inside and/or outside the administrative domain. For example, the computing device 42 may include a personal computer, a workstation, a laptop computer, a network-enabled personal digital assistant, a network-enabled mobile telephone, etc. Other examples of the computing device 42 include, but are not limited to, a server, a microprocessor, an integrated circuit, fax machine or any other component, machine, tool, equipment, or some combination thereof capable of responding to and executing instructions and/or using data.

The computing device 42 may perform the above-described actions automatically and may perform the actions for any number of 529 plans in any number of states, for any number of 529 plan accounts, and for any number of owners and beneficiaries. In order to perform the actions described hereinabove, the computing device 42 may execute a series of instructions. The instructions may be software code to be executed by the computing device 42. The software code may be stored as a series of instructions or commands on a computer readable medium such as a random access memory (RAM) and/or a read only memory (ROM), a magnetic medium such as a hard-drive or a floppy disk, or an optical medium such as a CD-ROM. The software code may be written in any suitable programming language using any suitable programming technique. For example, the software code may be written in C using procedural programming techniques, or in Java or C++ using object-oriented programming techniques.

While several embodiments of the disclosed invention have been described, it should be apparent, however, that various modifications, alterations and adaptations to those embodiments may occur to persons skilled in the art with the attainment of some or all of the advantages of the disclosed invention. For example, some of the method steps described hereinabove with respect to FIG. 1 may be performed concurrently or in a different order. It is therefore intended to cover all such modifications, alterations and adaptations without departing from the scope and spirit of the disclosed invention as defined by the appended claims.

What is claimed is:

1. A method for determining an earnings portion of a distribution from a 529 plan, the method comprising:

identifying, using a computing device comprising at least one processor, related 529 plan accounts from a plurality of 529 plan accounts; and determining an earnings portion (EP) of a distribution from at least one of the related 529 plan accounts as:

$$EP = \left(\frac{MV - (C - ROI)}{MV}\right) \times D,$$

wherein MV is an aggregate market value of the related 529 plan accounts, C is an aggregate value of contributions to the related 529 plan accounts, ROI is an aggregate value of return of investment of the related 529 plan accounts, and D is an amount of the distribution.

2. The method of claim 1, comprising receiving information associated with the plurality of 529 plan accounts.

3. The method of claim 1, comprising aggregating the information for related 529 plan accounts.

4. The method of claim 2, comprising receiving the information from a plurality of sources.

5. The method of claim 2, comprising receiving for each 529 plan account:
   a state plan identification number;
   an owner identification number; and
   a beneficiary identification number.

6. The method of claim 5, comprising receiving a social security number of an owner.

7. The method of claim 5, comprising receiving a social security number of a beneficiary.

8. The method of claim 2, comprising receiving a starting position for each 529 plan account.

9. The method of claim 8, comprising receiving for each 529 plan account:
   a fair market value;
   a value for life-to-date contributions; and
   a value for life-to-date return of investment.

10. The method of claim 1, comprising identifying 529 plan accounts having a common beneficiary.

11. The method of claim 1, comprising identifying 529 plan accounts having a common owner and beneficiary combination.

12. The method of claim 3, comprising aggregating the information for UGMA/UTMA accounts separately from the information for non-UGMA/UTMA accounts.

13. The method of claim 12, comprising aggregating the information for 529 plan accounts having a common beneficiary.

14. The method of claim 12, comprising aggregating the information for 529 plan accounts having a common owner and beneficiary combination.

15. The method of claim 1, comprising determining a return of investment portion of the distribution.

16. The method of claim 1, comprising determining when a maximum limit associated with a 529 plan account beneficiary is reached.

17. The method of claim 16, comprising determining when an aggregate market value for 529 plan accounts having a common beneficiary reaches a maximum value.

18. The method of claim 16, comprising determining when an aggregate total for life-to-date contributions for 529 plan accounts having a common beneficiary reaches a maximum value.

19. A system for determining an earnings portion of a distribution from a 529 plan, the system comprising:
   a processor in communication with a first computer-readable medium storing information associated with a plurality of active 529 plan accounts, wherein the processor is responsive to instructions stored on a second computer-readable medium of the system to:
      identify related 529 plan accounts from the plurality of 529 plan accounts; and
      determine an earnings portion (EP) of a distribution from at least one of the related 529 plan accounts as:

$$EP = \left(\frac{MV - (C - ROI)}{MV}\right) \times D,$$

wherein MV is an aggregate market value of the related 529 plan accounts, C is an aggregate value of contributions to the related 529 plan accounts, ROI is an aggregate value of return of investment of the related 529 plan accounts, and D is an amount of the distribution.

20. A computer-readable medium comprising instructions stored thereon, which, when executed by a processor, cause the processor to:
   identify related 529 plan accounts from a plurality of 529 plan accounts; and
   determine an earnings portion (EP) of a distribution from at least one of the related 529 plan accounts as:

$$EP = \left(\frac{MV - (C - ROI)}{MV}\right) \times D,$$

wherein MV is an aggregate market value of the related 529 plan accounts, C is an aggregate value of contributions to the related 529 plan accounts, ROI is an aggregate value of return of investment of the related 529 plan accounts, and D is an amount of the distribution.

21. The computer-readable medium of claim 20, comprising instructions stored thereon, which, when executed by the processor, cause the processor to determine when a maximum limit associated with a 529 plan account beneficiary is reached.

22. A method for determining an earnings portion of a distribution from a 529 plan, the method comprising:
   receiving information associated with a plurality of active 529 plan accounts, wherein receiving information includes receiving the following for each 529 plan account:
      a fair market value;
      a value for life-to-date contributions; and
      a value for life-to-date return of investment;
   identifying, using a computing device comprising at least one processor, related 529 plan accounts, wherein identifying related 529 plan accounts includes identifying 529 plan accounts having a common beneficiary or having a common beneficiary and owner;
   aggregating, using the computing device, the information for related 529 plan accounts; and
   determining an earnings portion of a distribution from at least one of the 529 plan accounts.

23. A system for determining an earnings portion of a distribution from a 529 plan, the system comprising:

a first computer-readable medium comprising a database to store information associated with a plurality of active 529 plan accounts, wherein the stored information for each 529 plan account comprises:
   a fair market value;
   a value for life-to-date contributions; and
   a value for life-to-date return of investment; and
a processor in communication with the first computer-readable medium, wherein the processor is responsive to instructions stored on a second computer-readable medium of the system to:
   receive the information associated with a plurality of 529 plan accounts from the database;
   identify related 529 plan accounts by identifying 529 plan accounts having a common beneficiary or having a common beneficiary and owner;
   aggregate the information for related 529 plan accounts; and
   determine an earnings portion of a distribution from at least one of the 529 plan accounts.

* * * * *